United States Patent
Shatzkamer et al.

(10) Patent No.: US 8,018,948 B2
(45) Date of Patent: Sep. 13, 2011

(54) P-GANC OFFLOAD OF URR DISCOVERY MESSAGES TO A SECURITY GATEWAY

(75) Inventors: Kevin Shatzkamer, New York, NY (US); Anand K. Oswal, Sunnyvale, CA (US); Jayaraman Iyer, Sunnyvale, CA (US); Mark Grayson, Maidenhead (GB); Navan Narang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 973 days.

(21) Appl. No.: 11/688,113

(22) Filed: Mar. 19, 2007

(65) Prior Publication Data
US 2008/0235783 A1    Sep. 25, 2008

(51) Int. Cl.
| | |
|---|---|
| H04L 12/28 | (2006.01) |
| H04L 12/56 | (2006.01) |
| H04J 3/16 | (2006.01) |
| H04J 3/22 | (2006.01) |
| G06F 9/00 | (2006.01) |
| G06F 15/16 | (2006.01) |
| G06F 17/00 | (2006.01) |

(52) U.S. Cl. .......... 370/395.2; 370/471; 726/12
(58) Field of Classification Search .......... None
See application file for complete search history.

(56) References Cited

U.S. PATENT DOCUMENTS

| 7,698,388 B2* | 4/2010 | Hoover et al. ............ 709/219 |
| 2006/0276139 A1* | 12/2006 | Pummill et al. ......... 455/67.11 |
| 2007/0188298 A1* | 8/2007 | Tariq et al. ............ 340/5.8 |
| 2007/0268855 A1* | 11/2007 | Grayson et al. ......... 370/328 |
| 2007/0268888 A1* | 11/2007 | Shatzkamer et al. ..... 370/352 |
| 2009/0075660 A1* | 3/2009 | Hallenstal et al. ..... 455/437 |

OTHER PUBLICATIONS

Backstrom M. et al "Mobile@Home—GSM services over wirelss LAN" Ericsson Review, 2005.*
Unlicensed Mobile Access (UMA); Protocols (Stage 3); 142 pages, UMA Protocols (Stage 3) R1.0.1 (Oct. 8, 2004) Technical Specification.

* cited by examiner

*Primary Examiner* — Xavier Szewai Wong
(74) *Attorney, Agent, or Firm* — Patent Capital Group

(57) ABSTRACT

In one embodiment, a security gateway receives an IPSec Initiation (IPSec INIT) request from a client. The security gateway may communicate with a AAA server to authenticate the client. After authentication, the security gateway intercepts a URR Discovery request from the client. The security gateway determines registration information for a response to the registration request. The registration information may be information on where the client can locate a D-GANC. A response is generated using the determined information and sent to the client. The response to the discovery request is performed without communicating with a P-GANC. Accordingly, a security gateway is used to authenticate the client and also to respond to the discovery request. This does not require that a P-GANC function be deployed in a network. Thus, cost and processing power may be saved.

20 Claims, 5 Drawing Sheets

P-GANC OFFLOAD OF URR DISCOVERY MESSAGES TO A SECURITY GATEWAY

TECHNICAL FIELD

Particular embodiments generally relate to networking.

BACKGROUND

In unlicensed mobile access (UMA) networks or generic access networks (GANs) a client needs to communicate with multiple functions on nodes to register on the network. This involves creating and tearing down multiple IPSec tunnels with the nodes. For example, a client first communicates with a security gateway where it is authenticated, which involves bringing up a first IPSec tunnel with a security gateway. After authentication, a registration request is sent to a provisioning GAN controller (P-GANC) to retrieve information on which default GAN controller (D-GANC) to contact. To connect to the D-GANC, the IPSec tunnel is terminated with the security gateway connected to the P-GANC and a new IPSec tunnel is established to a security gateway co-located with the D-GANC. Finally, the D-GANC communicates the location of a serving GANC (S-GANC). The client tears down the IPSec tunnel with the security gateway co-located with the D-GANC and then establishes a new IPSec tunnel to the security gateway co-located with the S-GANC in establishing a session.

Accordingly, multiple IPSec tunnels are brought up and torn down in the registration process. This involves a lot of processing power and is expensive. Further, the cost of maintaining the different nodes, such as the P-GANC, is costly especially when their functions in the call flows are limited.

DESCRIPTION OF EXAMPLE EMBODIMENTS

Overview

In one embodiment, a security gateway receives an IPSec Initiation (IPSec INIT) request from a client. The IPSec INIT request includes EAP-SIM credentials for authenticating the client. The security gateway may communicate with a AAA server to authenticate the client. After authentication, the security gateway intercepts a URR Discovery request from the client. The security gateway determines registration information for a response to the registration request. For example, information received from the AAA server during authentication, such as the client's identification information, may be used to determine the registration information. Additionally, the security gateway may query the AAA server again if information was not provided in the original authentication. The registration information may be information on where the client can locate a D-GANC. A response is generated using the determined information and sent to the client. The response to the discovery request is performed without communicating with a P-GANC. Accordingly, a security gateway is used to authenticate the client and also to respond to the discovery request. This does not require that a P-GANC function be deployed in a network. Often, the functions of the security gateway and GANC are not co-located. In some embodiments, a wide area network (WAN) circuit may be required to communicate between the security gateway and the GANC. If this is the case, then backhaul transit costs are also saved. Thus, cost and processing power may be saved because an extra secure tunnel does not have to be brought up to communicate with the P-GANC function.

Example Embodiments

Figure 1:
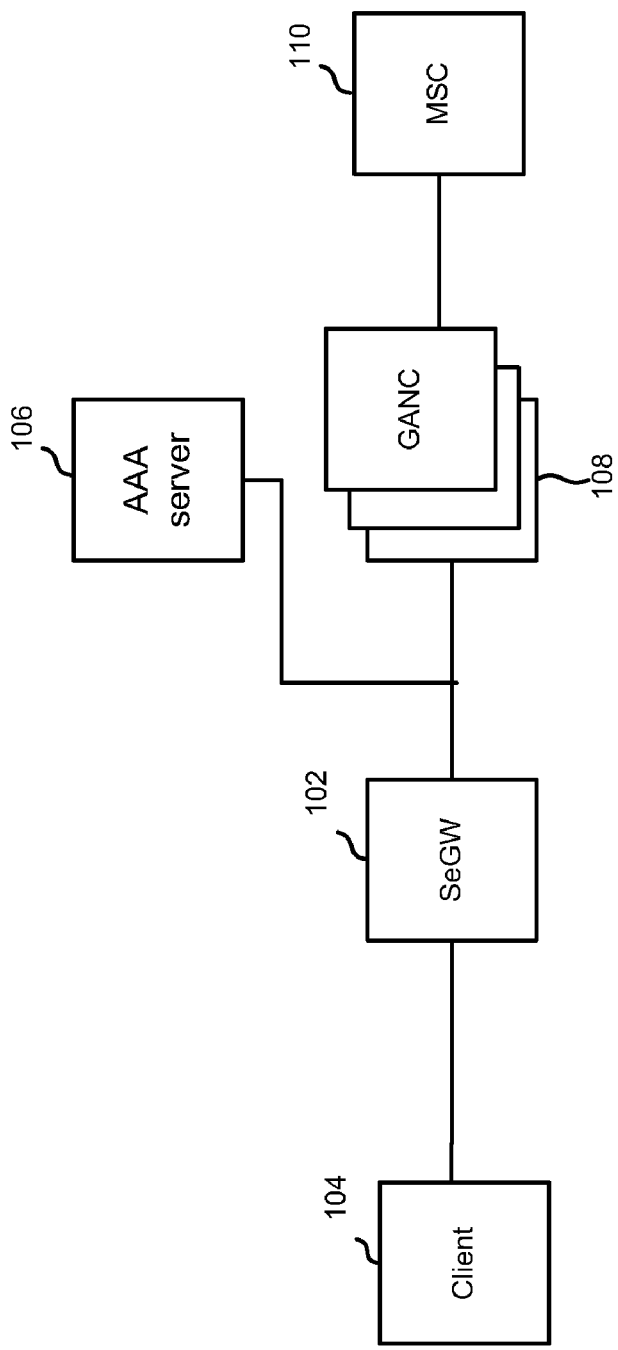
FIG. 1 shows an example of a system for offloading a registration request from a P-GANC.

FIG. 1 shows an example of a system for offloading a registration request from a P-GANC. The system includes a security gateway (SeGW) 102, a client 104, a AAA server 106, a GANC 108, and a mobile switching controller (MSC) 110. It will be understood that other components may be provided in the system.

Client 102 may be any computing device. For example, client 102 may be a mobile node, cellular telephone, personal digital assistant (PDA), laptop computer, personal computer, etc.

Security gateway 102 is any device configured to facilitate authentication of client 104. Security gateway 102 may have a unique address in which communications from client 104 may be sent. Security gateway 102 facilitates communications from/to client 104 and other components in the system, such as AAA server 106 and GANC 108.

Authentication, authorization, and accounting (AAA) server 106 is configured to provide any combination of authentication, authorization, and/or accounting services. In one embodiment, AAA server 106 is configured to authenticate client 104. Additionally, AAA server 106 may be configured to provide subscriber information for client 104. For example, the subscriber information can be used to determine which D-GANC should be used by client 104 upon receiving a registration request. Although a AAA server is described, it will be understood that any authentication server may be used.

GANC 108 may include different functions, such as those performed by a provisioning (P-GANC), default GANC (D-GANC), or serving GANC (S-GANC). Conventionally, the P-GANC is responsible for processing a UMA Radio Resource (URR) Discovery request. A response to this request indicates which D-GANC should be contacted. The D-GANC is configured to process a registration request, such as a URR registration request and provide bearer provisioning setup. The D-GANC in its URR registration reply tells client 104 which S-GANC should be used. The S-GANC is responsible for handling all control and bearer path traffic for the life of a user session.

GANC 108 is then connected to a cellular network. S-GANC may communicate with mobile switching controller (MSC) 110 to allow communications with a cellular network.

The functions of GANC 108 and security gateway 102 may not be co-located. Thus, different connections need to be brought up when functions of GANC 108 or security gateway 102 are contacted. As discussed in the background, if a P-GANC function is contacted after authentication by security gateway 102. Then, a connection is established with the P-GANC function. The P-GANC function is limited in what it performs (i.e., determines a location of the D-GANC to use), and thus particular embodiments offload this functionality to security gateway 102.

Figure 2:
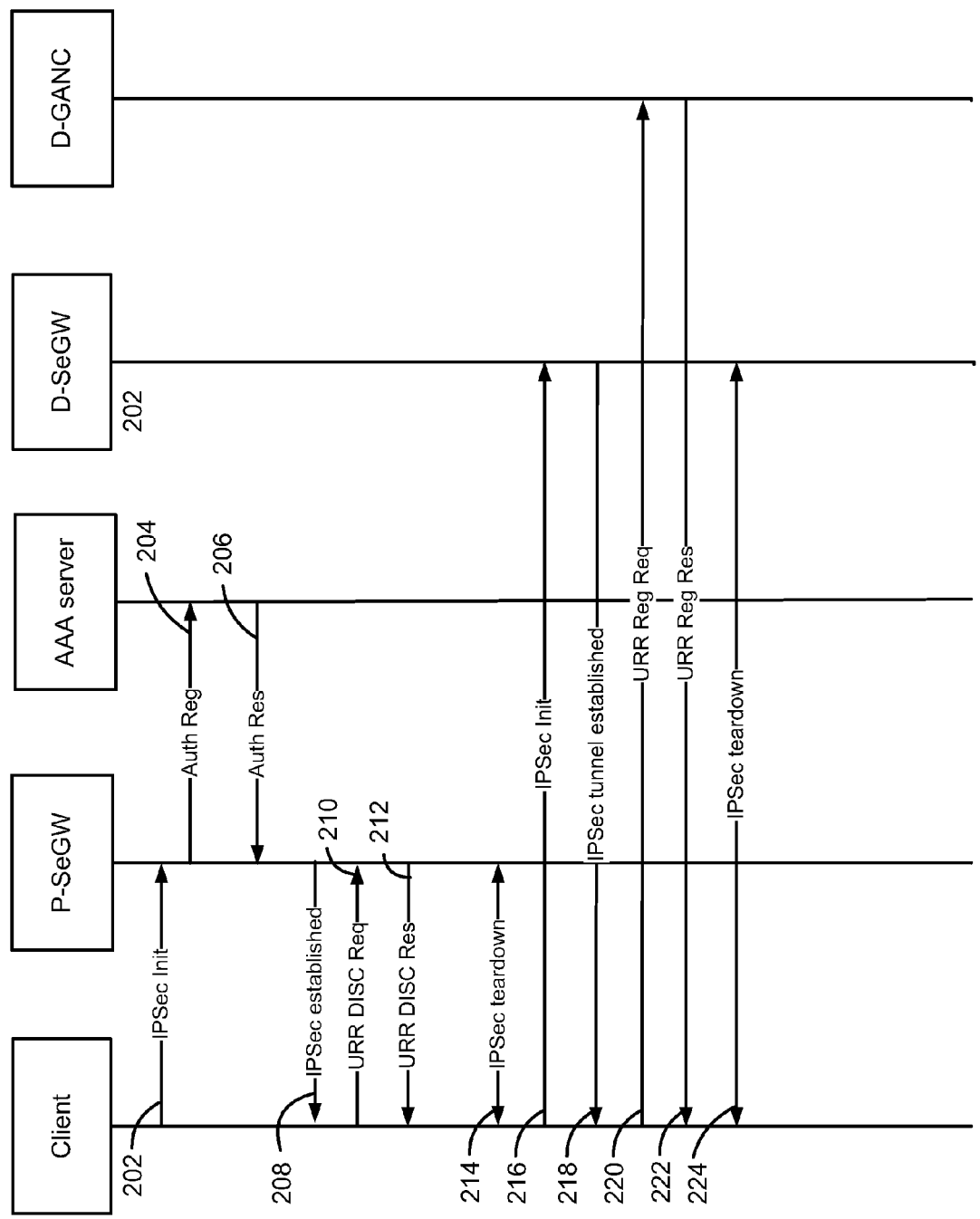
FIG. 2 shows an example of a call flow for offloading P-GANC functionality.

FIG. 2 shows an example of a call flow for offloading P-GANC functionality. At 202, client 104 sends a message to security gateway 102. For example, an IPSec initiation (IPSec INIT) message may be sent to a proxy security gateway (P-SeGW) function. This is a request to initiate a secure tunnel, such as an IPSec tunnel, and to be authenticated to access the network. The IPSec INIT request includes EAP-SIM credentials for authenticating client 104.

At 204, security gateway 102 sends an authentication request to AAA server 106. The request may include identification information for a client 104, such as the client's IMSI or other identification information.

At 206, AAA server 106 authenticates client 104 and sends an authentication response.

At 208, an IPSec tunnel is established between security gateway 102 and client 104.

At 210, client 104 sends a URR discovery request message. The URR discovery request message is a message for discovering where a D-GANC can be contacted for client 104. The URR discovery request is sent to security gateway 102 instead of a P-GANC. In one embodiment, client 104 is configured to send URR discovery request to a virtual IP address for security gateway 102, such as to a virtual IP address for a provisioning security gateway (P-SeGW) 102. In a second embodiment, client 104 is configured to send URR discovery request to the physical GANC, but a snooping function on the provisioning security gateway 102 intercepts this message.

Security gateway 102 may determine the common gateway interface (CGI) ID, access point ID, and/or the IMSI@ domain that are needed by the D-GANC to process the registration request. This information may be determined by AAA server 106 by accessing subscriber information accessible to the AAA server 106 either located in the home location register (HLR) or home subscriber server (HSS).

Conventionally, P-GANC would query a HLR for this information. The HLR hit is an expensive hit for a service provider and avoiding this communication also saves costs.

When a URR discovery request is received from client 104, security gateway 102 determines the user associated with client 104 and may respond with the default security gateway/GANC IP address or fully qualified domain name (FQDN). This information can be used by client 102 to contact the D-GANC and default security gateway (D-SeGW). Thus, reduction in traffic is provided because a connection does not have to be brought up with a P-GANC (an IPSec tunnel has already been brought up with security gateway 102). Thus, an offload of the bearer provisioning from a bearer node is provided. The P-GANC normally provided bearer provisioning by determining which D-GANC should be used, but this function is offloaded to security gateway 102.

At 212, security gateway 102 returns a URR discovery response. Information included in the URR discovery response includes the FQDN or IP address of the D-GANC and security gateway that client 104 should use.

At 214, the IPSec tunnel is torn down. At 216, an IPSec INIT message is sent to the proxy security gateway. At 218, an IPSec tunnel is established with the D-SeGW.

At 220, client 104 may send a URR registration request to the D-GANC through the tunnel established with the D-SeGW. The D-GANC can then send a URR registration reply at 222. This reply includes an address for the S-GANC and S-SeGW. The S-GANC is responsible for handling the control and bearer path traffic for the session for client 104. Also, the security gateway should be the gateway that is used during the session. At 224, the IPSec tunnel is torn down.

At 226, client 104 may establish an IPSec tunnel with the S-SeGW and register with the S-GANC through the S-SeGW.

In the above call flow, client 104 is required to send messages to different functions, such as the D-GANC and S-GANC. However, particular embodiments eliminate the need to communicate with a P-GANC. This eliminates the requirement of having to establish an IPSec tunnel with the P-GANC. Further, P-GANC function is limited in use and thus having to contact the P-GANC may be inefficient. Accordingly, by offloading the P-GANC function into a security gateway alleviates steps that may otherwise be required. For example, the URR discovery request and response may be performed using the IPSec tunnel that was established for the AAA authentication.

Figure 3:
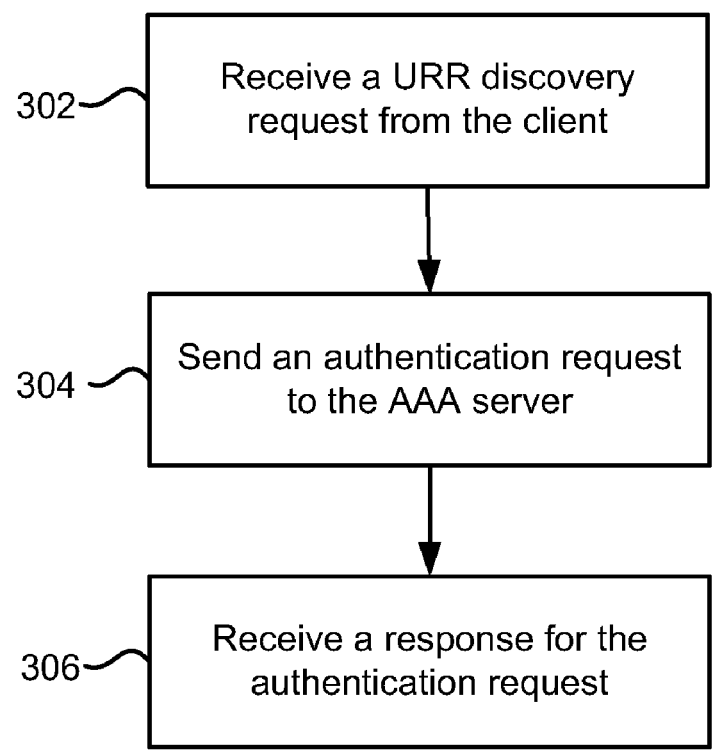
FIG. 3 depicts an example of a method for processing an access request.

FIG. 3 depicts an example of a flow chart for offloading the P-GANC functionality. At step 302, security gateway 102 receives a URR discovery request from client 104.

At step 304, security gateway 102 sends an authentication request to AAA server 106. AAA server 106 may authenticate client 104.

At step 306, security gateway 102 receives a response for the authentication request. If client 104 is authenticated, then an IPSec tunnel is established.

Figure 4:
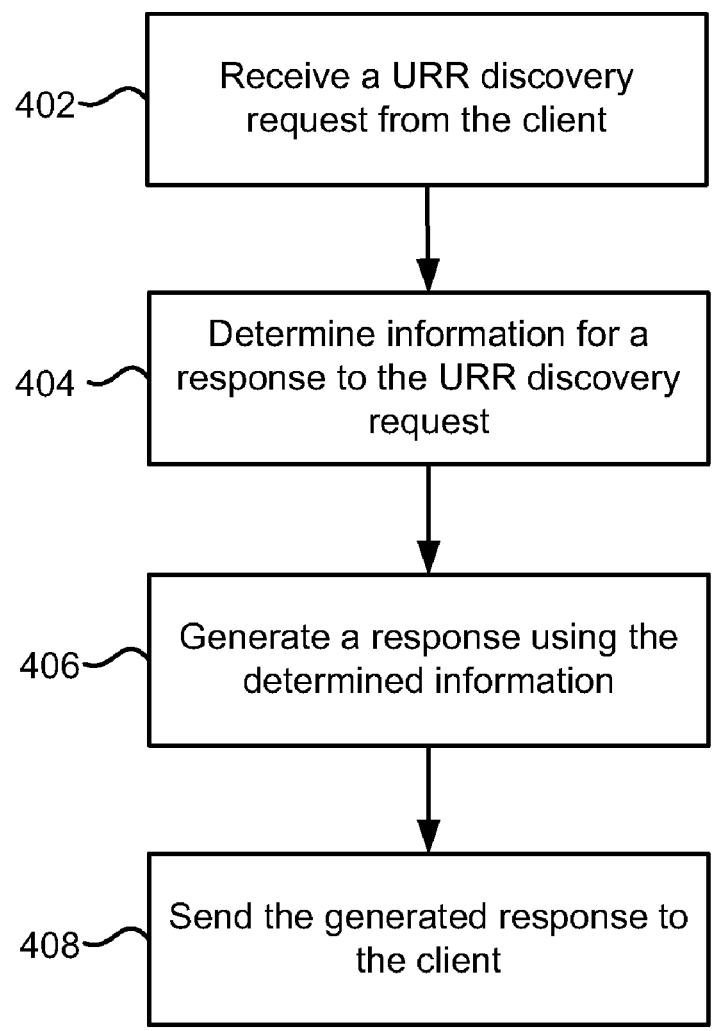
FIG. 4 depicts an example of a method for offloading P-GANC functionality to a security gateway.

FIG. 4 depicts an example of a method for offloading P-GANC functionality to a security gateway 102. At step 402, security gateway 102 receives a URR discovery request from client 104. In this case, client 104 is configured to send the URR discovery request to an IP address of security gateway 102. For example, a P-security gateway would have a virtual address assigned to receive URR discovery requests.

At step 404, security gateway 102 determines information for a response to the URR discovery request. For example, this information may include the Partially Qualified Domain Name (PQDN) and IP address for the D-security gateway and D-GANC. This information may be determined from the response from AAA server 106.

In step 406, security gateway 102 generates a response using the determined information. This response is generated without having to contact a P-GANC. For example, client 104 does not contact a P-GANC nor does security gateway 102.

At step 408, security gateway 102 sends the generated response to client 104. The generated response includes information for client 104 to contact the D-security gateway and D-GANC.

Figure 5:
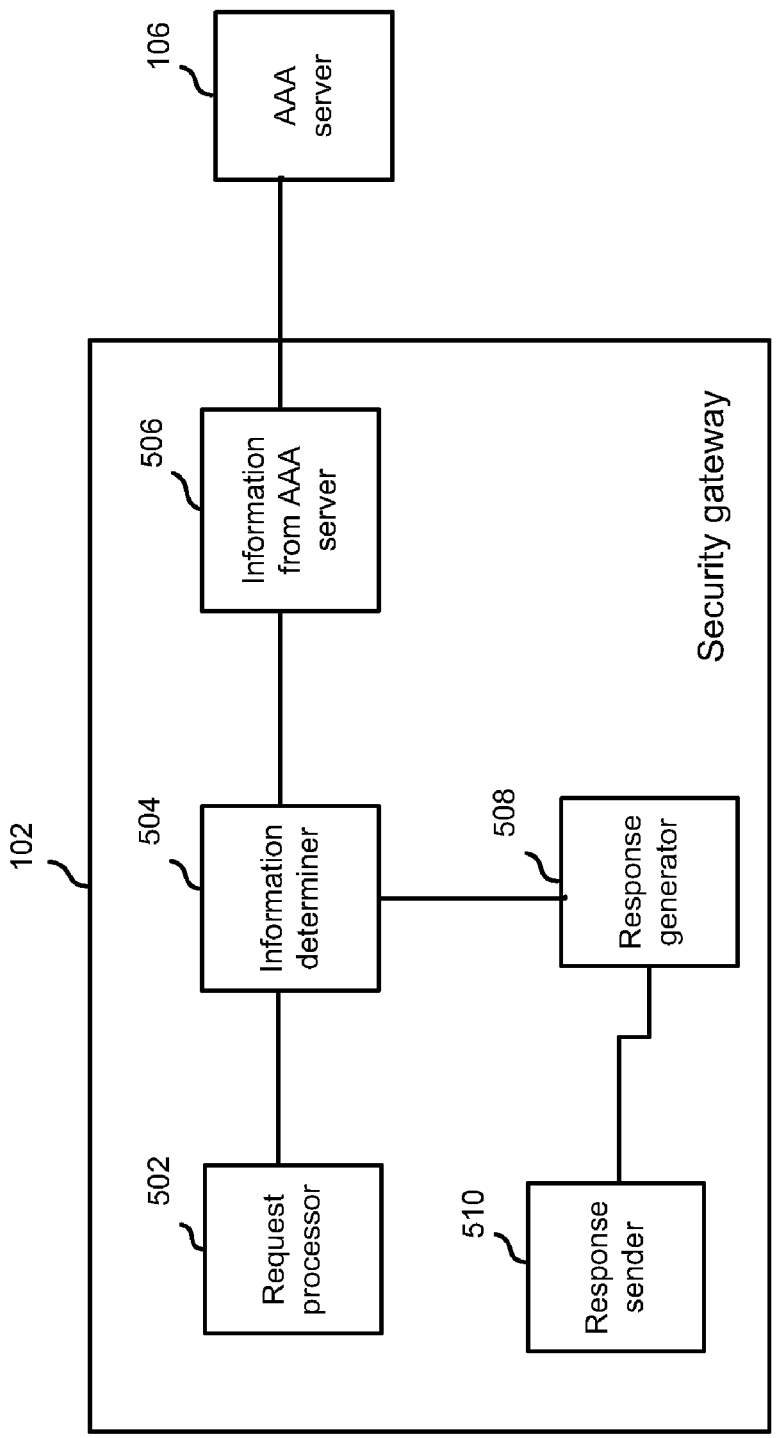
FIG. 5 shows a more detailed example of security gateway 102.

FIG. 5 shows a more detailed example of security gateway 102. A request processor 502 is configured to receive a URR registration request from client 104. An information determiner 504 then determines information for the request, such as a D-GANC for client 104 to use. For example, information 506 from AAA server 106 may be used to determine the D-GANC to use.

A response generator 508 then generates a response to the registration request. The response includes information on how to contact the D-GANC. A response sender 510 then sends the response to client 104.

Although the description has been described with respect to particular embodiments thereof, these particular embodiments are merely illustrative, and not restrictive. Although a URR discovery request is described, it will be understood that other messages may be used in place of the URR discovery request. For example, any message used for bearer provisioning may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope , as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving, at a security gateway, a discovery request from a node, the discovery request requesting information for a bearer provisioner;
   determining contact information for a response to the discovery request, the contact information indicating an address for the bearer provisioner, wherein the address identifies a Default Generic Access Network Controller (D-GANC) for use by the node;

generating the response including the determined contact information; and sending the generated response from the security gateway to the node for the node to subsequently contact the D-GANC, wherein the address for the bearer provisioner is provided to the node without having the node contact a Provisioning GANC (P-GANC), wherein the response includes a partially qualified domain name (PQDN) and Internet protocol (IP) address information associated with the D-GANC.

2. The method of claim 1, further comprising:

receiving, at the security gateway, an access request from the node;

sending an authentication request to an Authentication, Authorization, and Accounting (AAA) server; and receiving a response to the authentication request from the AAA server, the response including information associated with the node.

3. The method of claim 2, further comprising establishing a secure tunnel wherein the authentication request and the discover request is processed through the secure tunnel.

4. The method of claim 2, wherein the information received in the response to the authentication request is used to determine the contact information for the bearer provisioner.

5. The method of claim 2, wherein the information associated with the node comprises subscriber information for the node.

6. The method of claim 1, wherein the response is generated by the security gateway without contacting the P-GANC.

7. The method of claim 1, wherein the contact information comprises an address for a default security gateway.

8. The method of claim 1, wherein the security gateway and the bearer provisioner are not co-located.

9. The method of claim 1, wherein the discovery request comprises an Unlicensed Mobile Access (UMA) Radio Resource (URR) discovery request.

10. An apparatus comprising:

one or more processors; and logic encoded in non-transitory media for execution by the one or more processors, and when executed being configured to:

receive a discovery request from a node, the discovery request requesting information for a bearer provisioner;

determine contact information for a response to the discovery request, the contact information indicating an address for the bearer provisioner, wherein the address identifies a Default Generic Access Network Controller (D-GANC) for use by the node;

generate the response including the determined contact information; and send the generated response from a security gateway to the node for the node to subsequently contact the D-GANC, wherein the address for the bearer provisioner is provided to the node without having the node contact a Provisioning GANC (P-GANC), wherein the response includes a partially qualified domain name (PQDN) and Internet protocol (IP) address information associated with the D-GANC.

11. The apparatus of claim 10, wherein the logic when executed is further configured to:

receive an access request from the node;

send an authentication request to an Authentication, Authorization, and Accounting (AAA) server; and receive a response to the authentication request from the AAA server, the response including information associated with the node.

12. The apparatus of claim 11, wherein the logic when executed is further configured to establish a secure tunnel wherein the authentication request and the discover request is processed through the secure tunnel.

13. The apparatus of claim 11, wherein the information received in the response to the authentication request is used to determine the contact information for the bearer provisioner.

14. The apparatus of claim 11, wherein the information associated with the node comprises subscriber information for the node.

15. The apparatus of claim 10, wherein the response is generated by the security gateway without contacting the P-GANC.

16. The apparatus of claim 10, wherein the contact information comprises an address for a default security gateway.

17. The apparatus of claim 10, wherein the security gateway and the bearer provisioner are not co-located.

18. The apparatus of claim 10, wherein the discovery request comprises an Unlicensed Mobile Access (UMA) Radio Resource (URR) discovery request.

19. An apparatus comprising:

means for receiving, at a security gateway, a discovery request from a node, the discovery request requesting information for a bearer provisioner;

means for determining contact information for a response to the discovery request, the contact information indicating an address for the bearer provisioner, wherein the address identifies a Default Generic Access Network Controller (D-GANC) for use by the node;

means for generating the response using the determined contact information, wherein the response is generated without having the node contact a Provisioning GANC (P-GANC); and means for sending the generated response from the security gateway to the node for the node to subsequently contact the D-GANC), wherein the response includes a partially qualified domain name (PQDN) and Internet protocol (IP) address information associated with the D-GANC.

20. The apparatus of claim 19, wherein the discovery request comprises an Unlicensed Mobile Access (UMA) Radio Resource (URR) discovery request.

* * * * *